UNITED STATES PATENT OFFICE.

EDWIN ARCHER HALSETH, OF CLEARBROOK, MINNESOTA, ASSIGNOR OF ONE-HALF TO EDD BOE, OF CLEARBROOK, MINNESOTA.

COMPOSITION OF MATTER FOR TEMPERING STEEL.

1,296,951.  Specification of Letters Patent. Patented Mar. 11, 1919.

No Drawing.  Application filed July 24, 1918. Serial No. 246,543.

*To all whom it may concern:*

Be it known that I, EDWIN ARCHER HALSETH, a citizen of the United States, residing at Clearbrook, in the county of Clearwater and State of Minnesota, have invented a new and Improved Composition of Matter for Tempering Steel, of which the following is a full, clear, and exact description.

My invention relates to a composition of matter for tempering steel. The object of the invention is to provide a composition whereby steel can be hardened without danger of cracking the steel or warping the article in tempering.

The composition consists of the following ingredients and in substantially the following proportions:

Alum, 3 pounds; ammonium chlorid, $\frac{1}{4}$ pound; vinegar, $\frac{1}{2}$ gallon (or its equivalent of acetic acid); oil, $\frac{1}{2}$ gallon; lemon juice from about $\frac{1}{2}$ dozen lemons (or its equivalent of citric acid.)

This is mixed with five gallons of water, and the mixture is ready for tempering.

I preferably use a lubricating oil known in the trade as "tropical oil" and having the following characteristics:—

Gravity _____ 26
    Viscosity _____ 225 to 230
    Flash _____ 375
    Fire _____ 425
    Coat test _____ 30
    Color _____ #3 but it is to be understood that I am not restricted to the same as other oils may be used.

With certain stills the quantity of vinegar may be increased to three quarts and the quantity of oil decreased to one quart.

The ingredients above given are mixed in the following way:

The alum and ammonium chlorid are mixed with the vinegar, then the oil is added to the above mixture while the same is well stirred. This mixture is then poured into five gallons of water. The solution is then ready for tempering steel in the well known manner.

Having thus described my invention, I claim as new and desire to secure by Letters Patent:

A tempering mixture comprising alum, ammonium chlorid, vinegar, oil, lemon juice, and water, in proportions substantially as specified.

EDWIN ARCHER HALSETH.

Copies of this patent may be obtained for five cents each, by addressing the "Commissioner of Patents, Washington, D. C."